Aug. 18, 1964  K. SASSMANNSHAUSEN  3,144,993
SEARCH LIGHT

Filed April 21, 1961  4 Sheets-Sheet 1

INVENTOR
Knut Sassmannshausen
BY Michael S. Striker
Attorney

Aug. 18, 1964  K. SASSMANNSHAUSEN  3,144,993
SEARCH LIGHT

Filed April 21, 1961  4 Sheets-Sheet 2

INVENTOR
Knut Sassmannshausen
by
Michael S. Striker
Attorney

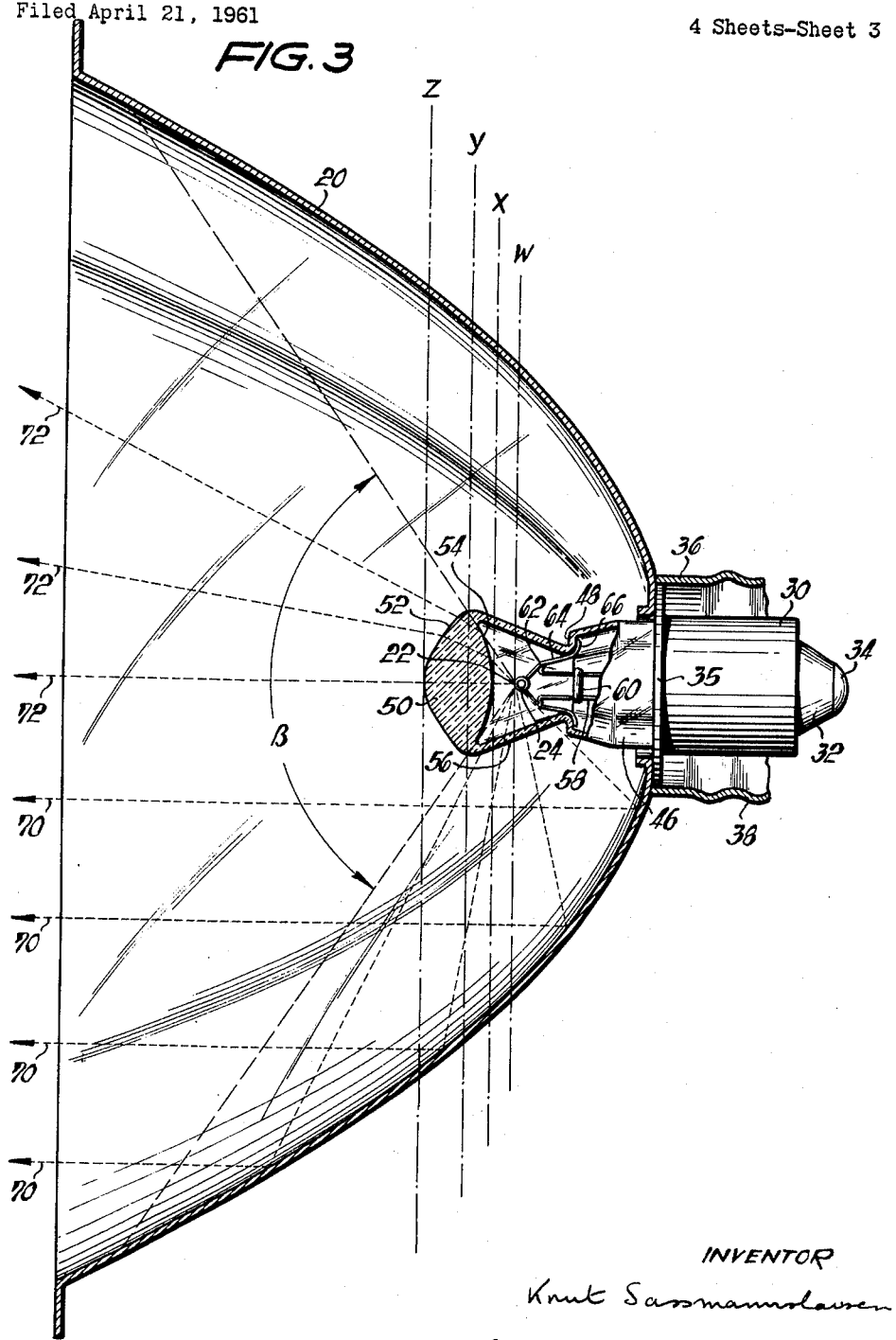

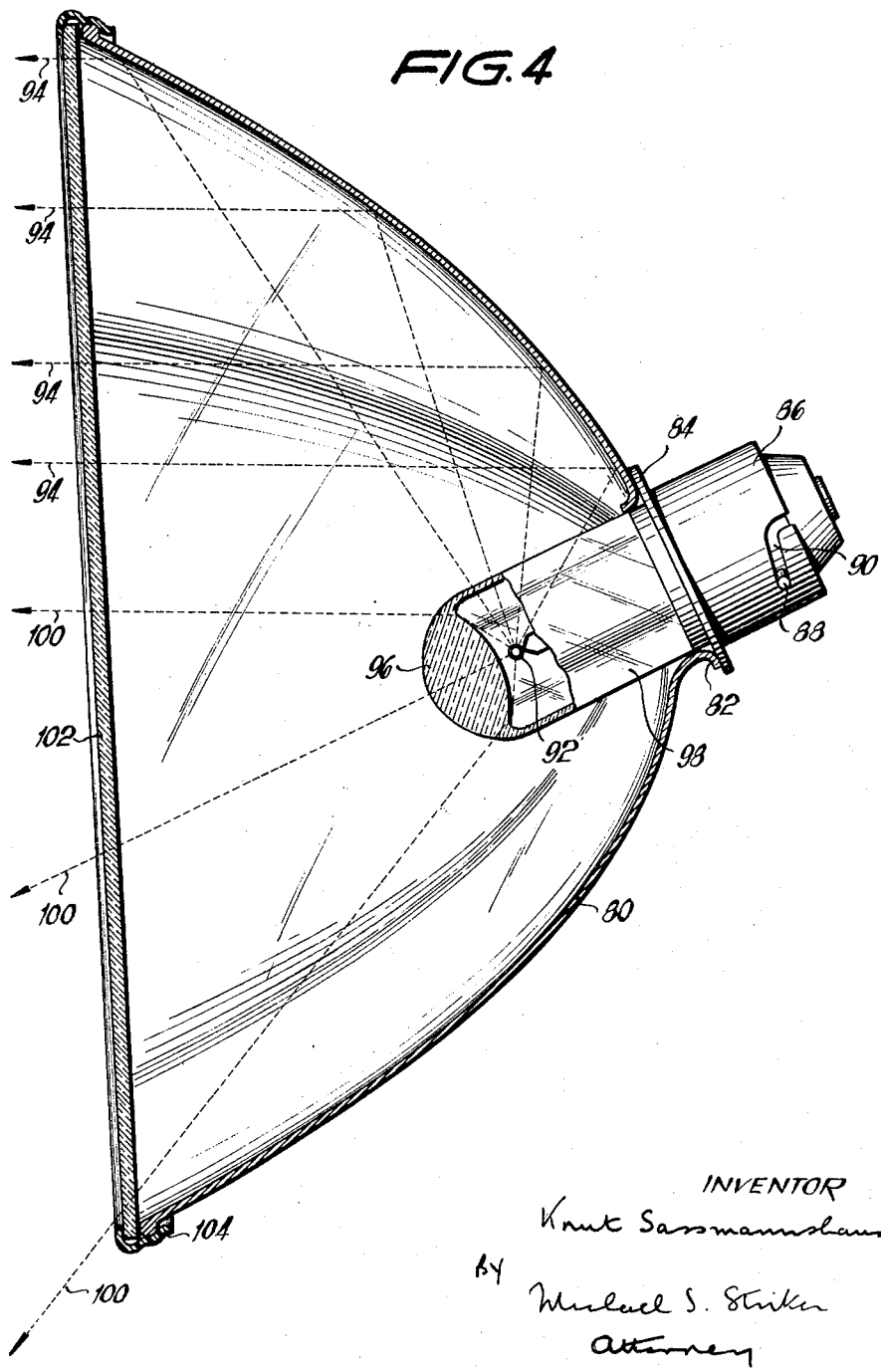

United States Patent Office 3,144,993
Patented Aug. 18, 1964

3,144,993
SEARCH LIGHT
Knut Sassmannshausen, Rothenbach,
Idar-Oberstein 3, Germany
Filed Apr. 21, 1961, Ser. No. 104,704
Claims priority, application, Germany, June 2, 1959,
S 63,259; Nov. 11, 1959, S 65,788; Apr. 22, 1960,
S 68,181
8 Claims. (Cl. 240—41.3)

The present invention relates to searchlights. This application is a continuation-in-part application of my co-pending application filed May 20, 1960, under the Serial No. 30,600.

It is one object of the present invention to provide a searchlight which simultaneously produces a long range beam and a short range beam.

It is a further object of the present invention to provide for a searchlight which produces a long range beam and a short range beam and in which the axes of the two beams coincide.

It is an additional object of the present invention to provide for a searchlight which produces a long range beam and a short range beam in which the axis of the short range beam is inclined under an angle to the axis of the long range beam.

It is yet an object of the present invention to provide for a searchlight producing a long range beam and a short range beam which is constructed from few and simple parts which can be manufactured at a reasonably low cost and which will provide trouble-free service under extended use.

With these objects in view the searchlight of the present invention mainly comprises a light source, first optical means connected to the source and cooperating therewith for projecting a first part of the light rays emanating from the light source in a light beam having a maximum angle of divergence of 10°, and second optical means connected to the light source and cooperating therewith for projecting a second part of the light rays emanating from the light source in a light beam having a maximum angle of divergence between 40° and 75°, and in which the first and second part of the light rays concentrated by the forementioned optical means within said beams constitute at least 75% of the light received by said optical means.

The first optical means are preferably in the form of a reflector located rearwardly of the light source, whereas the second optical means are preferably in the form of a condenser lens located forwardly of the light source.

The light source is preferably in the form of an incandescent lamp having a glass bulb constructed to form forwardly of the filament of the lamp a condenser lens for concentrating the light rays emanating from the filament and passing through the lens in a light beam having an angle of divergence between 40° and 75°. The reflector is preferably in the form of a parabolic reflector and the incandescent lamp is mounted in the reflector with the filament thereof substantially in the region of the focal point of the reflector.

The lens is preferably constructed with an outer surface having a radius of curvature increasing from the center to the periphery of the outer surface, and preferably the outer surface is a surface of revolution intersecting a plane through the axis thereof along a hyperbola.

The inner lens surface has preferably a radius of curvature decreasing from the center to the outer periphery of this surface. This surface is also preferably a surface of revolution intersecting a plane through the axis thereof along an ellipse having its small axis coinciding with the optical axis of the lens. However, different inner lens surfaces may also be used and the inner lens surface may have for instance a shape of a spherical segment.

The optical axis of the lens may coincide with the optical axis of the reflector or the two optical axes may be inclined at an angle between 15° and 70° to each other.

To obtain the best light distribution, it is preferred to locate the coiled filament of the incandescent lamp in a definite relation to the lens thereof and the coiled filament is preferably spaced from the lens in such a manner so that a pair of lines located in a plane of symmetry through the bulb and passing form a point of the filament nearest to the lens to the intersecting points of this plane of symmetry with the outer diameter of the lens include an angle between 90 and 150° preferably an angle between 105 and 115°. To prevent blackening of the lens during extended use it is preferred to construct in this case the lens with a minimum diameter of 7 mm.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a cross-section through the optical arrangement of the searchlight of the present invention and this figure illustrates a modification in which the optical axis of the condenser lens coincides with the optical axis of the parabolic reflector; and FIG. 4 is a cross-sectional view similar to FIG. 3, but illustrating a modification in which the optical axis of the condenser lens is inclined to the optical axis of the parabolic reflector.

Figure 1:
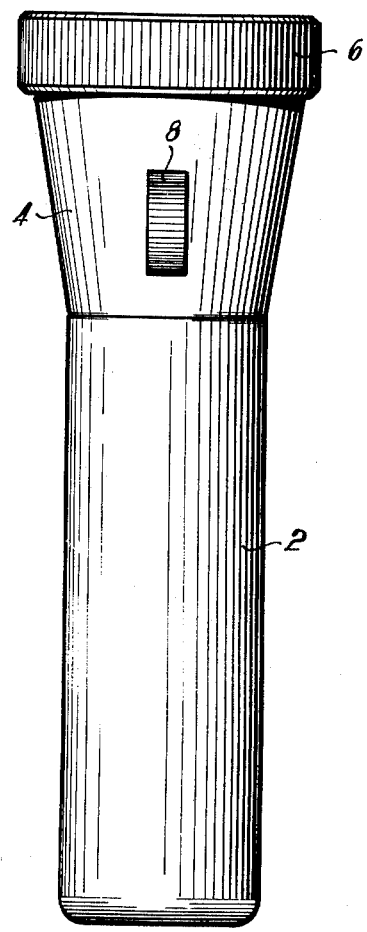
FIG. 1 is a side view of the searchlight of the present invention in which the searchlight is made in the form of a flashlight.

Referring now to the drawings, and more particularly to FIG. 1 of the same, it will be seen that the searchlight of the present invention may be constructed in the form of a flashlight having an elongated cylindrical body 2 adapted to house a battery or similar source of electrical energy, not illustrated in the drawing. Integrally formed with the body 2 and axially aligned therewith is a frustoconical portion 4 formed at its free end with a cylindrical ring 6 to which a parabolic reflector and lens arrangement, to be described in detail later on, is connected in any known manner. Mounted on the frustoconical portion 4 is a switch 8, only schematically illustrated in the drawing, and serving to connect and disconnect the lamp of the optical arrangement to the source of electrical energy in well-known manner.

Figure 2:
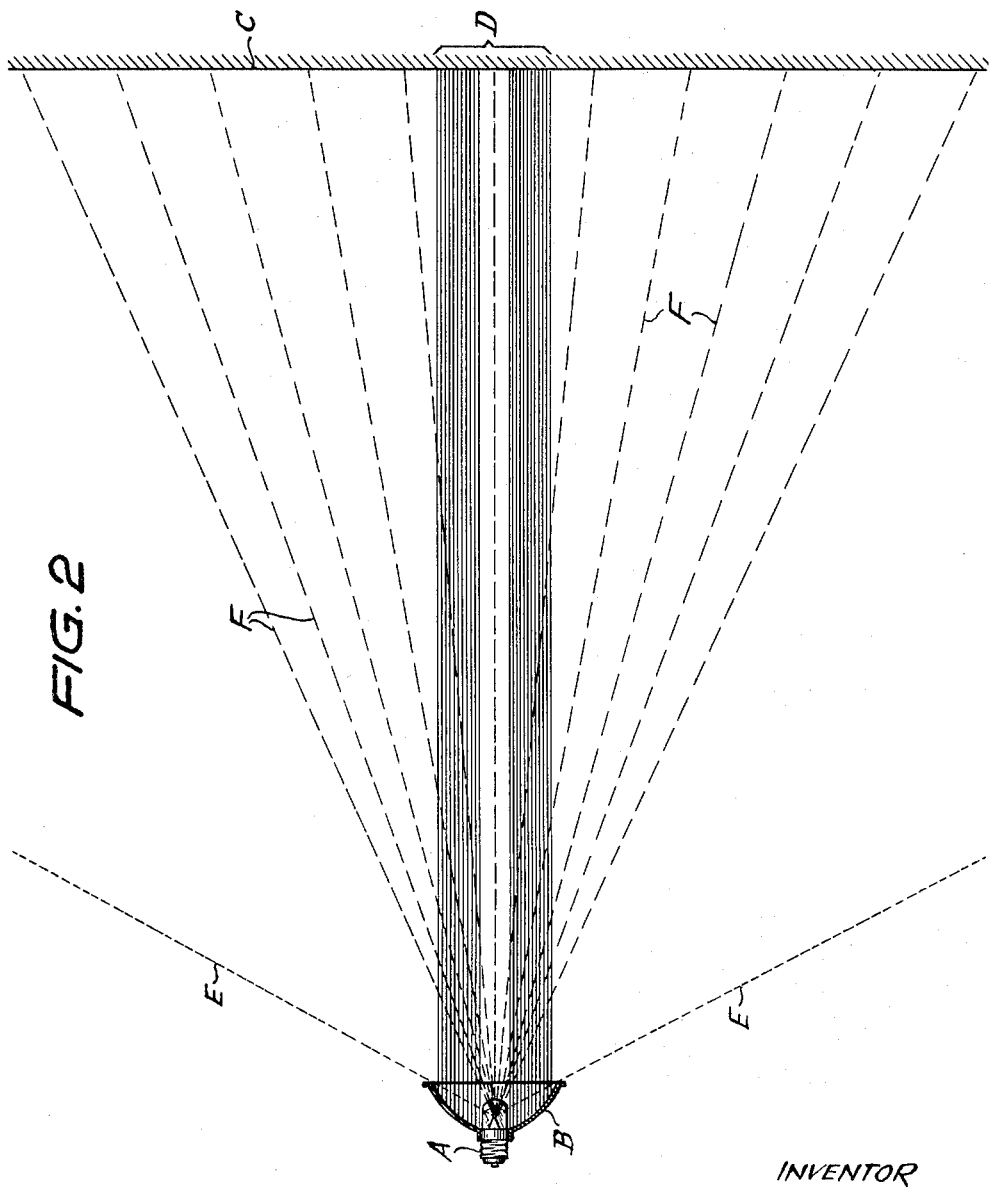
FIG. 2 is a schematic view illustrating the light beams produced by the searchlight of the present invention.

FIG. 2 schematically illustrates the light beams produced by the searchlight of the present invention. An incandescent lamp A is arranged in a parabolic reflector B with the filament of the lamp preferably arranged in the region of the focal point of the reflector. Normally, the light rays emanating forwardly from the incandescent lamp A would be limited by the rim of the reflector B to produce a conical beam as indicated by the dotted lines E. The lamp A according to the present invention, is however provided with a condenser lens, as will be described in detail later on, to produce a conical beam having an angle of divergence of substantially 50° as indicated by the dash lines F. The brightness per square inch thus produced is about ten times or even more the brightness produced by an incandescent lamp without condenser lens. The light rays emanating from the filament of the lamp A in lateral and rearward direction are reflected by the parabolic reflector to produce a long range light beam in which the light rays are substantially parallel or in which the same have a maximum angle of divergence of about 10°. The light beam produced by the reflector B will lighten up a circle of a diameter D on a wall C with extreme brightness, whereas the light rays F will illuminate the area about this circle to a lesser extent. The condenser lens of the lamp A is preferably constructed in such a way so as to produce on a disc of one meter diameter at a distance of about one meter from the lamp a substantially uniform brightness.

The specific construction of the condenser lens and the arrangement of the incandescent lamp and the parabolic reflector are shown in detail in FIG. 3 which illustrates an embodiment in which the optical axis of the condenser lens coincides with the optical axis of the parabolic reflector. The concave reflector 20, shown in section in FIG. 3 is preferably a parabolic reflector and an incandescent lamp is located in the interior of the reflector having a coiled filament 24 preferably located in the region of the focal point of the parabolic reflector. The inner surface of the reflector 20 is silvered or otherwise finished to provide a reflecting surface. Projecting rearwardly from the center region of the reflector 20 is a lamp socket 36 integrally formed with the reflector wall or connected thereto by soldering or welding. The socket 36 is formed with a diameter to snugly receive the flange 35 of the lamp base 30. The lamp base 30 carries at the right end thereof, as viewed in FIG. 3, an insulating body 32 and the center contact 34 of the lamp, both constructed and connected to the lamp base 30 in well-known manner. The threaded portion 38 of the lamp socket 36 receives a screw nipple (not shown) so as to press the flange 35 of the lamp tightly against the rear surface of the reflector. The glass body or bulb 46 of the incandescent lamp is shown also in section and the bulb is formed in the region of the rear end thereof with an inwardly extending annular restriction 48 and constructed to form at the front end thereof a condenser lens 50. The outer surface 52 of the condenser lens 50 is a surface of revolution having a radius of curvature increasing from the axis toward the outer periphery of this surface. Preferably the outer surface 52 is such that it intersects any plane passing through the axis thereof along a hyberbola. The specific construction of the outer surface 52 will produce a substantially uniform brightness on a surface normal to the axis of the short range beam produced by the condenser lens 50. The inner surface 54 of the condenser lens 50 may be in the form of a spherical segment, but preferably, this surface is constructed so that the radius of curvature thereof decreases from the center toward the periphery of the surface. Preferably the inner surface 54 is also a surface of revolution constructed in such a way so as to intersect any plane passing through the axis at the lens 50 along an ellipse having its small axis along the optical axis of of the lens. The portion of the light bulb between the maximum diameter of the lens 50 and the annular restriction 48 is preferably in the form of a cone frustum 56. The coiled filament 24 is connected to a pair of conductor wires 58 which are held together by a glass bead 60. The coiled filament 24 shown only in an end view in FIG. 3 is welded to the conductor wires 58 at the points 62 and the conductor wires 58 are bent at these points rearwardly to abut with the ends of the rearwardly extending portion 64 thereof at 66 against the annular restriction 48. This arrangement will assure a stable and secure support of the filament 24 at the preferred location.

Four parallel planes normal to the axis of the lens are schematically indicated by dash lines W, X, Y and Z. The plane W passes through the point 22 of the coiled filament 24 nearest to the lens 50, the plane X is tangent to the inner lens surface 54 at the optical axis of the lens, the plane Y passes through the maximum diameter of the lens, and the plane Z is tangent to the outer lens surface 52 at the optical axis of the lens.

The condenser lens 50 of the present invention is preferably constructed and arranged to the other element of the optical arrangement disclosed as follows:

The filament 24 of the lamp is located with respect to the lens in such a manner that a pair of lines located in the plane of symmetry through the light bulb and passing from the point 22 of the filament nearest to the inner lens surface 54 to the intersecting points of this plane of symmetry with the outer diameter of the lens include an angle β between 90 and 150°. Preferably this angle is held within smaller limits that is between 105° and 115°. The angle β is shown in the drawing as 110°. The maximum lens diameter is in this case preferably greater than 7 mm., since the lens would otherwise under consideration of the preferred angle β be located too near to the filament 24, which would lead with commonly used filament material to a premature blackening of the inner lens surface. The distance between the point 22 of the filament and the flange 35 of the lamp is preferably chosen between 55% and 100% of the maximum lens diameter. The first-mentioned dimension will produce a favorable distribution of the total light emanating from the lamp to the two light beams, whereas the second mentioned dimension will result in a small shadow effect of the lamp socket so that the size of the reflector in relation to the size of the lamp can be held within favorable limits. The distance of the point 22 from the flange 35 should be at least 4 mm. and this distance is made in the sample illustrated 10 mm. FIG. 3 is drawn to an enlarged scale of approximately 1:3. The distance between the plane X and Y is preferably 15% to 30% of the lens diameter, to locate, on the one hand the inner surface 54 of the lens not too close to the filament 24 and to produce, on the other hand, a maximum condensing effect. In the illustrated example the lens diameter is chosen with 10 mm. and the distance between the planes X and Y is chosen with 2 mm. and the distance of the point 22 of the filament from the plane Y 3 mm. When the bulb is made from glass of the type commonly used for the manufacturing of light bulbs it has been found desirable for manufacturing reasons to choose the distance of the point 22 of the filament from the plane Y between 80% and 150% of the quotient of lens diameter to lens thickness. This will result under considering the above-mentioned specific dimensions in a distance between plane Y and Z of 3 mm.

FIG. 3 illustrates also in dotted lines 70 the light rays reflected by the reflector 20 and in dotted lines 72 the light rays condensed by the condenser lens 50. To avoid confusion the light rays 70 are shown only in the lower part of FIG. 3, whereas the light rays 72 are shown only in the other part thereof.

While the arrangement illustrated in FIG. 3 will produce the best light efficiency, it may be desirable for certain applications, for instance if the searchlight of the present invention is used for bicycles, to incline the optical axis of the lens to the optical axis of the parabolic reflector. Such an embodiment is illustrated in FIG. 4. The parabolic reflector 80 illustrated in FIG. 4 is formed at the inner end thereof with an opening defined by a rim 82 located in a plane inclined to the optical axis of the reflector 80. The flange 84 of a bayonet socket 86 is welded or otherwise fixedly connected to the rim 82. In this case the lamp 98 is introduced from the exterior into the parabolic reflector 80 whereby the pin 88 of the lamp base engages in the slot 90 of the bayonet socket 86 of the reflector. The filament 92 of the lamp is again arranged in the region of the focal point of the parabolic reflector 80 so that the reflector 80 will produce a long range beam having light rays substantially parallel to each other and to the optical axis of the reflector as indicated in the upper part of FIG. 4 by dotted lines 94. The light ray 100 passing through the lens 96 will form a short range beam having an angle of divergence between 40° and 75° preferably about 50°. The optical axis of the lens 96 is inclined to the optical axis of the reflector at an angle between 15° and 70°, a preferred inclination is shown in FIG. 4 in which the optical axis of the lens is inclined to the optical axis of the reflector in such a way that the upper border ray of the conical beam produced by the lens 96 is substantially located in the optical axis of the reflector 80. The reflector may be closed at the outer end thereof by a glass plate 102 which is preferably slightly inclined to a line normal to the optical axis to permit passage of the light rays 100 in a downwardly inclined direction. The glass plate 102 is fixed to the outer edge of the reflector 80 by an elastic ring 104, which corresponds to the ring portion 6 shown in FIG. 1.

The searchlight of the present invention may be used as a flashlight held in the hand of the user in various applications. For instance, the short range beam may be used to illuminate the front of the house, whereas the long range beam may be used to more distinctly illuminate the house number, or, during hiking in the night through a forest the long range beam may be used to observe the general course of the path through the forest, while the short range beam will illuminate the immediate surroundings of the user. The optical arrangement according to the present invention may also be mounted in housings different from the housings shown in FIG. 1 so that the searchlight of the present invention may be used as a bicycle lamp or as a searchlight to be mounted on motor cars or ships.

It will be understood that each of the elements described above, or two or more together, may also find a useful application in other types of searchlights differing from the types described above.

While I have illustrated and described the invention as embodied in a searchlight for simultaneously producing a long range beam and a short range beam, I do not intend to be limited to the details shown, since various modifications and structural changes may be made without departing in any way from the spirit of my invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A searchlight comprising, in combination, a concave parabolic reflector; a light source located at the focal point of said reflector so that the latter concentrates a first part of the light emanating from said light source in a beam having substantially parallel rays; and a condenser lens located forwardly of said light source and having a focal point located rearwardly of the focal point of said reflector so that said condenser lens directs a second part of the light emanating from said light source in a conical light beam having an angle of divergence between 40 and 75°, said parabolic reflector having in a plane normal to the optical axis thereof and passing through the condenser lens a diameter substantially larger than the diameter of the condenser lens to define with the latter a substantially annular space surrounding the condenser lens and through which all of the parallel rays pass without engaging said condenser lens.

2. An searchlight as set forth in claim 1 in which the optical axis of said parabolic reflector coincides with the optical axis of said condenser lens.

3. A searchlight as set forth in claim 1 in which the optical axis of said parabolic reflector includes an angle with the optical axis of said condenser lens.

4. A searchlight as set forth in claim 1 in which said light source is in the form of an incandescent lamp having a filament located at the focal point of said reflector and a glass bulb surrounding said filament, and in which said condenser lens is formed by a portion of said glass bulb located forwardly of said filament.

5. A searchlight as set forth in claim 4 in which the inner surface of said condenser lens facing said filament intersects a plane passing through the axis of said lens along a curve having a radius of curvature constantly decreasing from said axis toward the periphery of said lens.

6. A searchlight as set forth in claim 5 in which said curve is substantially in the form of an ellipse having a small axis coinciding with the optical axis of the lens.

7. A searchlight as set forth in claim 4 in which the outer surface of said condenser lens facing away from said filament intersects a plane passing through the axis of said lens along a curve having a radius of curvature constantly increasing from said axis toward the periphery of said lens.

8. A searchlight as set forth in claim 7 in which said curve is substantially in the form of a hyperbola.

References Cited in the file of this patent
UNITED STATES PATENTS

| | | |
|---|---|---|
| 1,168,064 | Elsaesser | Jan. 11, 1916 |
| 1,471,923 | Saxon | Oct. 23, 1923 |
| 1,594,635 | Skogland | Aug. 3, 1926 |
| 1,961,964 | Dodge | June 5, 1934 |
| 2,014,573 | Kliegl | Sept. 17, 1935 |
| 2,245,793 | Kurlander | June 17, 1941 |
| 2,282,167 | Cullman | May 5, 1942 |
| 2,289,160 | Yost | July 7, 1942 |